(12) United States Patent
Nikodym

(10) Patent No.: US 6,855,913 B2
(45) Date of Patent: Feb. 15, 2005

(54) FLUX-CORED WIRE FORMULATION FOR WELDING

(75) Inventor: Anthony Nikodym, Troy, OH (US)

(73) Assignee: Hobart Brothers Company, Troy, OH (US)

( * ) Notice: Subject to any disclaimer, the term of this patent is extended or adjusted under 35 U.S.C. 154(b) by 62 days.

(21) Appl. No.: 10/064,683

(22) Filed: Aug. 6, 2002

(65) Prior Publication Data

US 2004/0026396 A1 Feb. 12, 2004

(51) Int. Cl.⁷ .............................................. B23K 9/00
(52) U.S. Cl. ........................... 219/137 WM; 219/136
(58) Field of Search ............................... 219/137 WM, 219/136, 146.21, 146.23, 146.24, 146.41, 146.51

(56) References Cited

U.S. PATENT DOCUMENTS

| | | | |
|---|---|---|---|
| 4,463,243 A | * | 7/1984 | Church .......................... 219/74 |
| 4,527,040 A | | 7/1985 | Moon et al. .................. 219/121 |
| 4,634,476 A | | 1/1987 | Bergson ....................... 420/73 |
| 4,738,389 A | | 4/1988 | Moshier et al. ............. 228/198 |
| 4,800,131 A | * | 1/1989 | Marshall et al. ............. 428/558 |
| 5,003,155 A | | 3/1991 | Chai et al. ............... 219/145.22 |
| 5,055,655 A | | 10/1991 | Chai et al. ............... 219/145.22 |
| 5,091,628 A | | 2/1992 | Chai et al. ............... 219/145.22 |
| 5,118,919 A | | 6/1992 | Chai et al. .............. 219/137 WM |
| 5,132,514 A | | 7/1992 | Chai et al. ............... 219/145.22 |
| 5,225,661 A | | 7/1993 | Chai et al. ............... 219/145.22 |
| 5,227,609 A | | 7/1993 | Simon et al. ............. 219/137 R |
| 5,300,754 A | | 4/1994 | Gonzalez et al. ......... 219/146.3 |
| 5,352,304 A | | 10/1994 | DeArdo et al. ............. 148/336 |
| 5,523,540 A | | 6/1996 | Coldren et al. ...... 219/137 WM |
| 5,622,572 A | | 4/1997 | Wells, Jr. et al. ........... 148/320 |
| 5,744,782 A | | 4/1998 | Sampath et al. ......... 219/146.1 |
| 5,760,365 A | | 6/1998 | Milewski et al. ....... 219/121.64 |
| 6,191,379 B1 | | 2/2001 | Offer et al. .................... 219/75 |

* cited by examiner

Primary Examiner—M. Alexandra Elve
(74) Attorney, Agent, or Firm—Houston Eliseeva LLP

(57) ABSTRACT

A weld wire having a core composition comprising a combination of graphite and a compound of potassium is disclosed. The combination of graphite and the compound of potassium in the core composition does not exceed approximately 5% by weight, making it possible for the wire to be used in an alternating current welding process without destabilizing a welding arc. The wire comprises the compound of potassium, which is $K_2MnTiO_4$, wherein the combination of graphite and the compound of potassium in the core composition is selected from the range of about 0.3% to about 5% by weight.

30 Claims, 6 Drawing Sheets

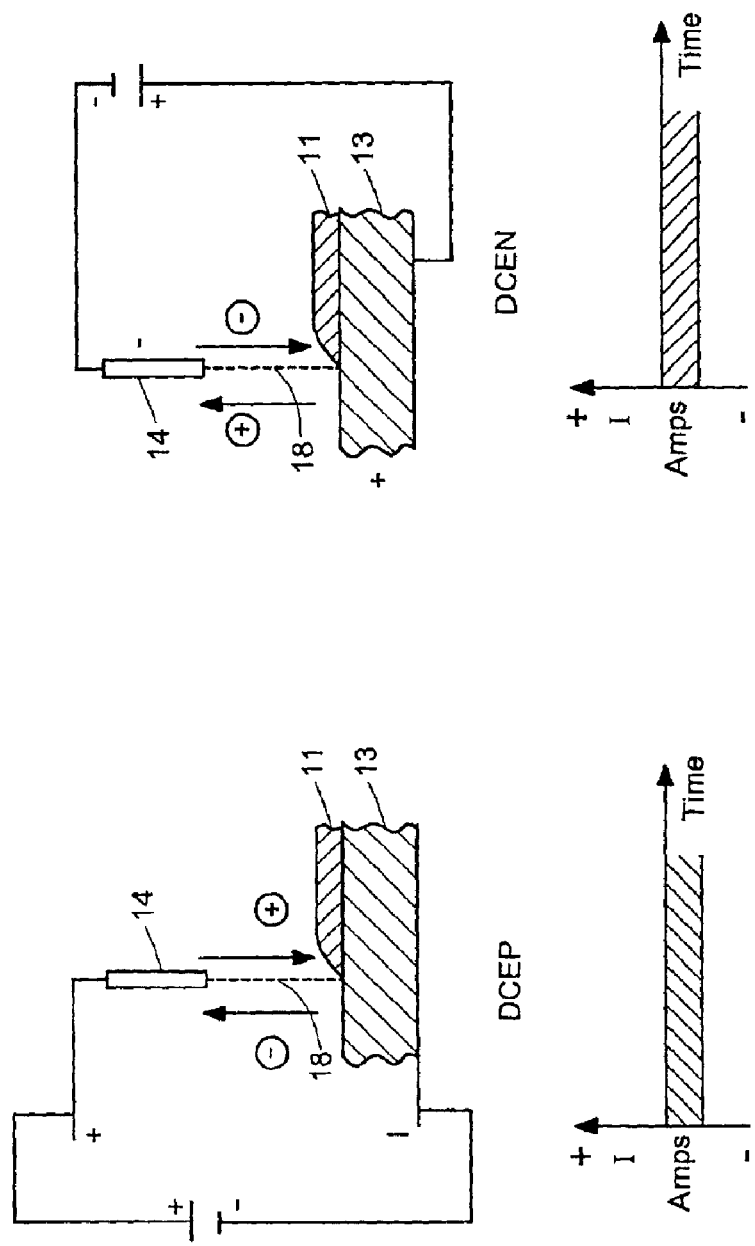

FIG. 6

Table 2
Chemical Composition Requirements for Weld Metal from Composite Electrodes

AWS A5.18/A5.18M:2001

| AWS Classification[a] | | UNS Number[b] | Shielding Gas[c] | Weight Percent[d] | | | | | | | | | |
|---|---|---|---|---|---|---|---|---|---|---|---|---|---|
| A5.18 | A5.18M | | | C | Mn | Si | S | P | Ni[e] | Cr[e] | Mo[e] | V[e] | Cu |
| Multiple Pass Classifications | | | | | | | | | | | | | |
| E70C-3X | E48C-3X | W07703 | 75–80% Ar/Balance $CO_2$ or $CO_2$ | 0.12 | 1.75 | 0.90 | 0.03 | 0.03 | 0.50 | 0.20 | 0.30 | 0.08 | 0.50 |
| E70C-6X | E48C-6X | W07706 | 75–80% Ar/Balance $CO_2$ or $CO_2$ | 0.12 | 1.75 | 0.90 | 0.03 | 0.03 | 0.50 | 0.20 | 0.30 | 0.08 | 0.50 |
| E70C-G(X) | E48C-G(X) | | [f] | Not Specified[g] | | | | | | | | | |
| Single Pass Classifications | | | | | | | | | | | | | |
| E70C-GS(X) | E48C-GS(X) | | [f] | Not Specified[h] | | | | | | | | | |

Notes:
a. The final X shown in the classification represents a "C" or "M" which corresponds to the shielding gas with which the electrode is classified. The use of "C" designates 100% $CO_2$ shielding (AWS A5.32 Class SG-C). "M" designates 75–80% Ar/balance $CO_2$ (AWS A5.32 Class SG-AC-Y, where Y is 20 to 25). For E70C-G [E48C-G] and E70C-GS [E48C-GS], the final "C" or "M" may be omitted if these gases are not used for classification.
b. SAE/ASTM Unified Numbering System for Metals and Alloys.
c. Use of a shielding gas other than that specified will result in different weld metal composition.
d. Single values are maximums.
e. The sum of Ni, Cr, Mo, and V shall not exceed 0.50%.
f. Shielding gas shall be as agreed upon between purchaser and supplier, unless designated by the C or M suffix.
g. Composition shall be reported; the requirements are those agreed to between purchaser and supplier.
h. The composition of weld metal from this classification is not specified since electrodes of this classification are intended only for single pass welds. Dilution, in such welds, usually is quite high.

Table 2
Chemical Composition Requirements for Weld Metal from Composite Electrodes[a]

| AWS Classification[d] | UNS Number[e] | Weight Percent[b,c] | | | | | | | | | | | | | |
|---|---|---|---|---|---|---|---|---|---|---|---|---|---|---|---|
| | | C | Mn | Si | P | S | Ni | Cr | Mo | V | Ti | Zr | Al | Cu | Other Elements Total |
| | | | | | | | Manganese–Molybdenum Weld Metal | | | | | | | | |
| E90C-D2 | W19230 | 0.12 | 1.00–1.90 | 0.90 | 0.025 | 0.030 | — | — | 0.40–0.60 | — | — | — | — | 0.35 | 0.50 |
| | | | | | | | Chromium–Molybdenum Weld Metal | | | | | | | | |
| E70C-B2L | W52030 | 0.05 | 0.40–1.00 | 0.25–0.60 | 0.025 | 0.030 | 0.20 | 1.00–1.50 | 0.40–0.65 | — | — | — | — | 0.35 | 0.50 |
| E80C-B2 | W52030 | 0.05–0.12 | 0.40–1.00 | 0.25–0.60 | 0.025 | 0.030 | 0.20 | 1.00–1.50 | 0.40–0.65 | — | — | — | — | 0.35 | 0.50 |
| E80C-B3L | W53130 | 0.05 | 0.40–1.00 | 0.25–0.60 | 0.025 | 0.030 | 0.20 | 2.00–2.50 | 0.90–1.20 | — | — | — | — | 0.35 | 0.50 |
| E90C-B3 | W53030 | 0.05–0.12 | 0.40–1.00 | 0.25–0.60 | 0.025 | 0.030 | 0.20 | 2.00–2.50 | 0.90–1.20 | — | — | — | — | 0.35 | 0.50 |
| | | | | | | | Nickel Steel Weld Metal | | | | | | | | |
| E80C-Ni1 | W21030 | 0.12 | 1.50 | 0.90 | 0.025 | 0.030 | 0.80–1.10 | — | 0.30 | — | — | — | — | 0.35 | 0.50 |
| E70C-Ni2 | W22030 | 0.08 | 1.25 | 0.90 | 0.025 | 0.030 | 1.75–2.75 | — | — | — | — | — | — | 0.35 | 0.50 |
| E80C-Ni2 | W22030 | 0.12 | 1.50 | 0.90 | 0.025 | 0.030 | 1.75–2.75 | — | — | — | — | — | — | 0.35 | 0.50 |
| E80C-Ni3 | W23030 | 0.12 | 1.50 | 0.90 | 0.025 | 0.030 | 2.75–3.75 | — | — | — | — | — | — | 0.35 | 0.50 |
| | | | | | | | Other Low-Alloy Weld Metal | | | | | | | | |
| EXXC-G | | | | | | | Not Specified[f] | | | | | | | | |

Notes:
a. Chemical requirements for composite electrodes are based on analysis of their weld metal in the as-welded condition and using the shielding gas specified in Table 3.
b. The weld metal shall be analyzed for the specific elements for which values are shown in this table. If the presence of other elements is indicated in the course of this work, the amount of these elements shall be determined to ensure that their total (excluding iron) does not exceed the limit specified for "Other Elements, Total."
c. Single values shown are maximums.
d. Solid electrodes are generally recommended for gas tungsten arc welding (GTAW) or plasma arc welding (PAW).
e. SAE/ASTM Unified Numbering System for Metals and Alloys.
f. In order to meet the requirements of the G classification, the electrode must have as a minimum of one or more of the following: 0.50 percent nickel, 0.30 percent chromium, or 0.20 percent molybdenum. Composition shall be reported; the requirements are those agreed to by the purchaser and supplier.

FIG. 7

FLUX-CORED WIRE FORMULATION FOR WELDING

BACKGROUND OF INVENTION

The present invention relates in general to the field of gas metal arc welding and electrodes for gas metal arc welding. More specifically, the present invention deals with compositions of weld wires and methods of using such weld wires in the alternating current GMAW welding process, while minimizing the problems inherent in the alternating current GMAW processes.

Gas metal arc welding (GMAW) is a welding process in which an electrical arc between a filler metal and a work piece heats the filler metal and the work piece and welds them together. The filler metal in the GMAW process is usually a consumable electrode which is fed into the process as fast as it is consumed. The current passes through the electrode and the electrical arc is formed between the tip of the consumable electrode and the metal of the work piece. The GMAW welding process can be used to join two pieces of sheet metal together, as well as in many other applications. An example of a welding gun and an arrangement for GMAW is schematically shown in FIG. 1. A consumable welding electrode 14 is fed into the welding process through a welding gun 10. Electrode 14 is melted by an electrical arc 18 established between the electrode and the work piece consisting of metal sheets 11 and 13. Externally supplied gas, such as Ar, $CO_2$ or mixtures thereof, enters the welding process through a gas nozzle 12 in welding gun 10 and shields the arc, the tip of the electrode and the pool of molten metal 15 by forming a gas shield 16. The advantages of the GMAW process are the high quality weld that can be produced faster and with very little spatter and loss of alloying elements due to the gas shield and a stable electrical arc.

The consumable electrode in FIG. 1, which is melted by the electrical arc, is transported by the arc to the work piece to serve as a filler metal. The arc produces the heat for the welding process and is maintained by the electron flow from a cathode (positive terminal) and an anode (negative terminal). In the GMAW context both the consumable electrode and the work piece can function as a cathode or an anode.

The electrical power for arc welding is obtained in two different ways. One of the ways is to generate it at the point of use, the other way is to convert it from available power from the utility line. The power conversion can involve a transformer converting a relatively high voltage from the utility line to a liner voltage for alternating current welding. Or it can involve a transformer to lower the voltage, following by a rectifier changing the alternating current to direct current for direct current welding. One of the advantages of the alternating current is cathode-related cleaning (sputtering) which removes refractory oxides from the joint surfaces, providing superior welds. In such a case, argon is the inert gas of choice for manual welding whether used with direct or alternating current.

In a straight polarity configuration the electrode is negative and the work piece is positive, which configuration is called direct current electrode negative (DCEN). In a reverse polarity configuration the electrode is positive and the work piece is negative, which configuration is called direct current electrode positive (DCEP). In a schematic illustration of a DCEP configuration in FIG. 2(a) the electron flow is directed from a negatively charged work piece to a positively charged electrode, while the flow of positively charged ionized particles of the shielding gas flows to the negatively charged work piece, bombarding it and adding to the overall heating of the work piece and causing deep penetration of the weld into the work piece. In a schematic illustration of a DCEN configuration shown in FIG. 2(b) the electron flow is directed from a negatively charged electrode to a positively charged work piece, while the flow of the ionized shielding gas flows from the work piece to the electrode. Therefore, in the DCEN configuration the heat flow is directed away from the work piece toward the electrode, resulting in a higher electrode melting rate and a lesser heating of the work piece. The GMAW process normally uses a direct current electrode positive (DCEP) configuration, which produces a stable arc and low spatter in GMAW applications the direct current electrode negative (DCEN) configuration often results in a non-stable erratic arc, sputter, produces poor quality weld, and, therefore it is rarely used.

When alternating current is used for welding, the process can be considered as a combination of DCEP and DCEN, as shown in FIG. 3(b), however, the current often can not flow smoothly through the electrode in the reverse polarity configuration due to the certain electrical characteristics of the process. The difficulty is caused by the arc being extinguished during each half-cycle as the current reduces to zero at each zero crossing point, requiring reigniting as the voltage rises again after each zero crossing. After reigniting the current increases again and undergoes the usual volts-amperes power cycle. As the current decreases again, the arc potential decreases. The greater the arc length is, the lower is the temperature of the arc gas, therefore a higher reigniting potential will be required to reignite the arc at each zero crossing. Depending upon the thermal inertia of the hot electrode terminals and plasma, it is possible for the cathode emitter to cool sufficiently approaching a zero crossing to stop the arc completely. When a welding electrode and a welding work piece have different thermal ability to emit electrons, the current will flow by different amounts during each half-cycle. In the worst case the arc may not reignite at all, if the cathode cools sufficiently and the rectification of the reverse polarity cycle causes arc to operate erratically.

The extinguishing of the arc during each half cycle and the rectification of the reverse polarity cycle have been the two main reasons weighing against commercial applicability of alternating current in GMAW welding processes, leading to such host of problems as arc rectification, arc stumbling, arc wandering and arc outages. Maintaining the arc during the zero crossing of the alternating current is quite difficult and often requires higher voltages than could be tolerated by the peripheral equipment. On the other hand, it would be desirable to use the deep penetration into the work piece occurring during the negative half cycle and cleaning occurring during the positive half cycle in an alternating current GMAW process.

Manipulating the AC waveform is one of the ways to influence the welding process and try to stabilize the arc. It would be desirable, of course, to design a waveform that increases the deposition of the metal while being adaptable to the current existing welding platforms. The conventional waves used in the SAW process, which are essentially normal sinusoidal waves, with the higher amplitude of the electron negative part of the cycle as compared to the electron positive part of the cycle. Under such operating conditions the arc usually remains erratic, lowering the deposition rate. The attempts to improve this conventional arrangement have mostly failed, because of the limitation of the wire feed speed. Also, to maintain a high deposition rate is at a lower frequency, the droplets should become larger, and, inversely, at a higher frequency AC the size of the droplets can be smaller and the transfer of the droplets will go smoother.

One of the ways to stabilize the arc in the GMAW process is to alter the composition of the wire electrode to add fluxing and alloying elements which function as arc stabilizers. Carbon steel metal cored wires for GMAW are flux-cored wires used as electrodes comprising a flux filler core encapsulated by a metal sheath. The core of the wire electrode is made of fluxing and alloying compounds, which core becomes a deposited weld material. The composition of the core determines the composition and physical characteristics of the weld metal. Generally, the compounds contained in the core are selected to function as deoxidizers, alloying elements, arc stabilizers and may provide additional shielding gas. Metal cored wires provide the ability to add various materials to the core, influencing the welding characteristics and conditions in a way that overcomes traditional known flaws inherent in the alternating current GMAW process. Therefore, it would be desirable to have an electrode wire with a core composition allowing to maintain the stability of the arc in an alternating current GMAW welding process while exhibiting the desired high deposition and fast fill characteristics.

SUMMARY OF INVENTION

The present invention addresses the above-referenced need by providing a wire comprising a sheath encapsulating a core having a specific core composition. The core composition comprises a combination of graphite and a compound of potassium, the combination of graphite and the compound of potassium in the core composition not exceeding approximately 5% by weight, making it possible for the wire to be used in an alternating current welding process without destabilizing a welding arc. The wire comprises the compound of potassium, which is $K_2MnTiO_4$, wherein the combination of graphite and the compound of potassium in the core composition is selected from the range of about 0.3% to about 5% by weight. The wire preferably has the diameter of not exceeding 3/32", but the wires up to 5/32" can be used. It is contemplated by the present invention that larger diameter wires can be successfully used, such as a 1/8" wire or a 5/32" wire, provided that a power source generating more than 1000A is used for the welding process.

The wire of the present invention works in the alternating current platform, wherein the alternating current does not exceed 1000A at and the amplitude of an electron negative cycle reaches about 850–900 A. For the wire to have the tensile strength which does not exceed 90,000 psi, the percentage of graphite in the combination is reduces by 30%, while the percentage of the titanate is increased by about 30%.

BRIEF DESCRIPTION OF DRAWINGS

FIGS. 2(a)–(b) are schematic illustrations of the DCEP and DCEN welding configurations and corresponding current-time diagrams.

FIG. 6 is a chemical composition table.

FIG. 7 is a chemical composition table.

DETAILED DESCRIPTION

A solution to the waveform problem described above is the design of the waveform incorporating an offset making the electron negative amplitude of the 90 Hz AC cycle much higher than the electron positive part of the cycle. Such a waveform allows for a preheating of the wire during the electron negative part of the cycle, so that when the AC follows the electron positive part of the cycle, less energy will be required to transfer the droplets from the already preheated weld wire and the transfer is not be violent or erratic. If the same deposition rate is to be maintained at a lower frequency, the droplets should become larger, and, inversely, the higher frequency is used, the smaller the size of the droplets should be and the smoother the transfer should go.

It has been discovered that in conventional AC welding machine with the zero crossing problem and a lower frequency, a novel composition of a metal core wire provides a good deposition rate and does not cause the adverse effect of the stability of the arc and the transfer of droplets. The metal-cored wire of the present invention is a wire used in the alternating current GMAW welding process with a recommended shielding gas comprising Ar and $CO_2$ or a mixture thereof. The preferred combination of the mixture of Ar and $CO_2$ comprises a minimum of 75% and a maximum of 95% of Ar.

The wire of the present invention exhibits high deposition rates (about 30–40% higher than solid wire electrodes), high travel speeds (about 30–40% higher than solid wire electrodes) and is well suited for semi-automatic, automatic and robotic welding on mild steel. The typical undiluted weld metal chemistry of such wire is shown in Table 1.

TABLE 1

|  | C | Mn | Si | P | Ni | S |
|---|---|---|---|---|---|---|
| 75% Ar/25% $CO_2$ | 0.06–0.07 | 1.1–1.28 | 0.5–0.65 | 0.011 | 1.0 | 0.011 |
| 90% Ar/10% $CO_2$ | 0.06–0.07 | 1.1–1.35 | 0.5–0.70 | 0.011 | 1.0 | 0.010 |

It is also contemplated by the present invention that the chemical composition of the weld metal from the wire electrode of the present invention conforms to the ANSI/AWS A5.18–93 and ANSI/AWS A5.28–96. The respective composition of the weld metal from electrode wires according to ANSI/AWS A5.18–93 is provided in FIG. 6. The respective composition of the weld metal from electrode wires according to ANSI/AWS A5.28–96 is provided in FIG. 7.

Figure 1:
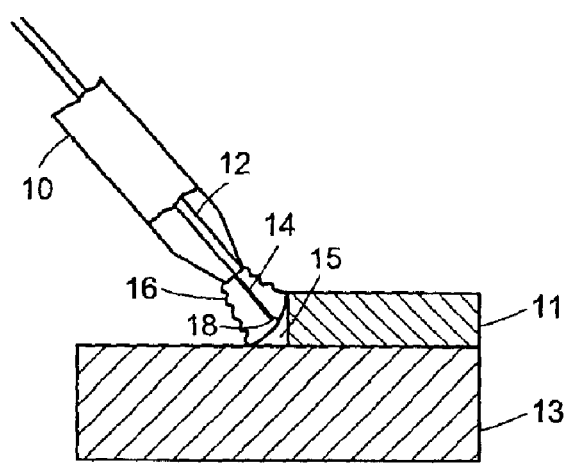
FIG. 1 is a schematic illustration of a welding gun nozzle and a work piece.
Figure 3A:
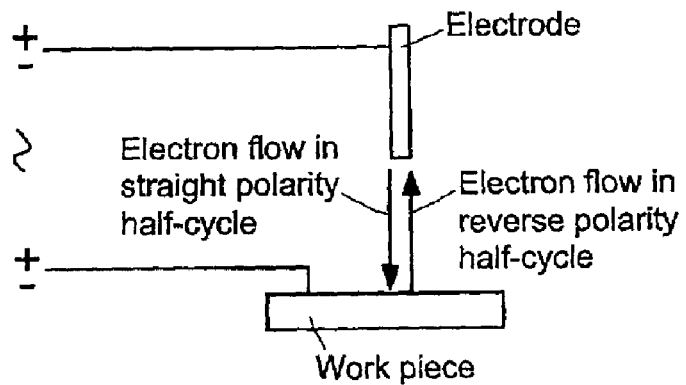
FIG. 3(a) is a schematic illustration of the alternating current welding process.
Figure 3B:
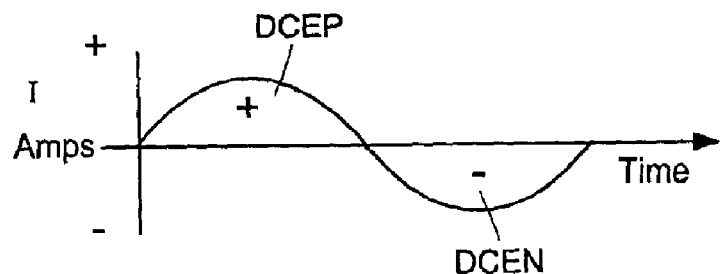
FIG. 3(b) is a graph of the alternating current cycle.
Figure 4:
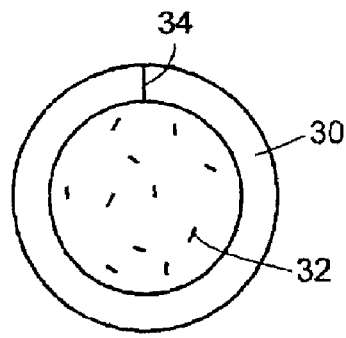
FIG. 4 is a cross sectional view of the metal-cored wire of the present invention.

As shown in FIG. 4, the wire of the present invention comprises a sheath 30 encapsulating a core of the wire 32. Core 32 is usually made of a compacted powder and has a preselected chemical composition. For the purposes of the present invention, the core composition comprises a combination of graphite and one or more compounds of potassium. It is contemplated by the present invention that the graphite and compounds of potassium can be present in the core homogeneously or heterogeneously in the form of clusters, strands or other suitable configuration. According to the preferred embodiment of present invention, about 1% wt of Ni was added to the composition disclosed in Table 1. Depending on a particular application, the percentage of Ni in the wire can vary from about 0% wt to about 4% wt. The total percentage of the combination of graphite and potassium compound(s) in the composition of the weld wire does not exceed approximately 5% wt, with the preferred total percentage of graphite and potassium compound(s) selected from the range of about 0.3% to about 5.0%. It has been established that the addition of the combination of graphite and one or more compounds of potassium has dramatically increased the stability of the arc in the straight polarity welding process. In particular, the addition of the preferred potassium compound, such as potassium manganese titanate ($K_2 MnTiO_4$), has contributed to the described effect of stabilizing the arc in the alternating current welding process particularly advantageously. The most effective arc stabilizing range of the core composition for the preferred potassium compound $K_2 MnTiO_4$ and graphite was the combination selected from the range of about 0.3% wt to about 5.0% wt. It is important to note that it turned out to be disadvantageous to use potassium sulfate $K_2 SO_4$ in the present composition, since the presence of sulfur caused the large scale cracking and arc destabilization.

In another embodiment of the present invention the percentage of graphite in the combination was reduced about 30% and the percentage of the titanate in the combination was increased about 30% to maintain the tensile strength of the wire at about 90,000 psi and to maintain the same advantageous qualities of the welding arc.

A particularly advantageous diameter of the wire electrode of the composition described above used in the alternating current GMAW welding process was about 2.4 mm (3/32") which can still be used with the available conventional power sources. For that wire diameter a 1000A AC welding machine was used with the waveform having the EN peak of about 850–900 A. A larger wire diameter could be produced and used as described, but such welding process will require a larger power source. For example, a 1/8" diameter wire have to work with a 1300 A/ 120 Hz welding machine running as efficiently at a similar deposition speed as the 3/32" wire. A 5/32" wire will work with a power source of about 1750A/ 160–180 Hz to maintain efficiency.

The process of manufacturing the metal-cored wire of the present invention involves a series of steps in which a strip (or a sheath material) is fed through the shaping dies which bend the strip and shape it into a shape that later can be filled with the ingredients of the core composition. Usually, the shape is a U-shape. The shaped sheath is then filled with the core composition, which, according to the present invention, comprises up to 1% wt of Ni and a combination of graphite and one or more compounds of potassium up to 5% wt. The present invention contemplates the percentage of Ni to be from about 0% wt to about 4% wt. As described above, the preferred compound of potassium is potassium manganese titanate ($K_2 MnTiO_4$) in a combined total (with graphite) selected from the range of about 0.3% to about 5.0% wt. The wire then travels through the closing dies which close it into a tubular form, causing the sheath to encapsulate the core and forming a metal-cored wire with a seam 34, as shown in FIG. 4. The core composition usually comprises powdered ingredients that are fed into the sheath. The powder is compacted when the closed wire is fed through the drawing dies to reduce the wire's diameter to the final size and compress the core.

Figure 5:
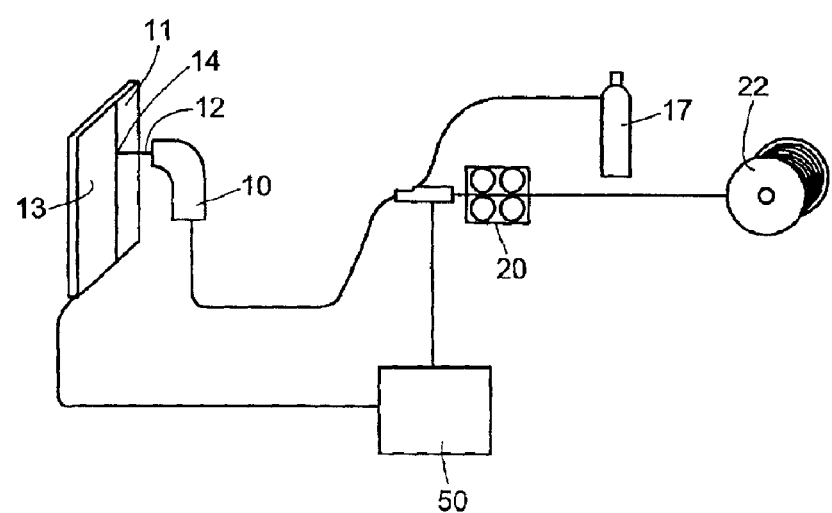
FIG. 5 is a schematic illustration of an alternating current welding apparatus with a wire electrode of the present invention.

A welding apparatus for alternating current GMAW utilizing the present invention exhibits great arc stability and improves the overall quality of the weld. An illustrative example of the welding apparatus in accordance with the present invention is provided in FIG. 5. The welding apparatus comprises an alternating current power supply 50, a welding gun 10 with electrode 14 and means for feeding the electrode into the welding gun. An example of the means for feeding the electrode shown in FIG. 5 is a wire drive 20 and a wire reel 22. It should be understood, of course, that any other way of feeding the wire electrode into the welding gun falls within the scope and spirit of the present invention. A shielding gas is supplied to the welding process through gas nozzle 12 in the welding gun. Electrode 14 has a sheath and a core having a core composition comprising a combination of up to 1% wt of Ni, graphite and one or more compounds of potassium, the combination of graphite and compounds of potassium in the core composition not exceeding approximately 5% by weight. The present invention contemplates the percentage of Ni to be from about 0% wt to about 4% wt. The preferred potassium compound is potassium manganese titanate ($K_2 MnTiO_4$), and the preferred combination of graphite and potassium compounds is selected from the range of about 0.3% to about 5.0%. For the gas metal arc welding process in which the welding gun is coupled to an alternating current power supply, the preferred shielding gas is a mixture of Ar and $CO_2$ mixed in the 75% Ar/25% $CO_2$ or 90% Ar/10% $CO_2$ proportions. The arc formed between the wire electrode of the present invention and the work piece (sheets 11 and 13 in FIG. 5) exhibits great stability, high depositions rates of up to 40 pounds per hour, reduced spatter of the molten electrode and reduced warpage of the weld. The shielding gas can be supplied to the welding process from an external source 17, as shown in FIG. 5.

To form a weld on a work piece using the welding apparatus with a novel metal-cored wire electrode of the present invention, a welding process uses a welding apparatus with means for feeding the wire electrode and means for supplying a shielding gas into the apparatus. The means for feeding the wire into the welding apparatus can comprise a wire drive and a wire reel, or any other suitable arrangement supplying the wire into the apparatus with the speed sufficient to replace the portion of the wire consumed during the welding process. It is contemplated that the means for feeding the wire into the welding apparatus can be internal or be located outside of the apparatus. The welding apparatus is coupled to an alternating current power supply and the arc is formed between the electrode and the work piece on which the weld is to be formed. Supplying the shielding gas into the welding process can be done from an external gas supply feeding the gas into a gas nozzle of the welding apparatus.

Feeding the wire electrode of the present invention into the welding apparatus involves providing the wire with a sheath and a core having a core composition with a combination of graphite and one or more compounds of potassium not exceeding approximately 5% by weight. As described above, the preferred compound of potassium is potassium manganese titanate ($K_2 MnTiO_4$) and the preferred combination of graphite and potassium compounds is selected from the range of about 0.3% to about 5.0% wt. The preferred mixture of shielding gas is a mixture of Ar and $CO_2$ mixed in the 75% Ar/25% $CO_2$ or 90% Ar/10% $CO_2$ proportions. The above-described welding process is preferably used in the alternating current gas-metal arc welding process.

What is claimed is:

1. A wire comprising a sheath encapsulating a core having a core composition, the core composition comprising a combination of graphite and a compound of potassium, wherein the compound of potassium is $K_2MnTiO_4$, the combination of graphite and the compound of potassium in the core composition not exceeding approximately 5% by weight, the wire capable of being used in an alternating current gas-metal arc welding process.

2. The wire of claim 1, wherein the combination of graphite and the compound of potassium in the core composition is selected from the range of about 0.3% to about 5% by weight.

3. The wire of claim 1, wherein the diameter of the wire does not exceed 3/32".

4. The wire of claim 3, wherein the alternating current does not exceed 1000 A at and the amplitude of an electron negative cycle reaches about 850–900 A.

5. The wire of claim 1, wherein the diameter of the wire is about 5/32".

6. The wire of claim 5, wherein the alternating current does not exceed 1750 A at and the frequency is between 160 Hz and 180 Hz.

7. The wire of claim 1, wherein the wire composition comprises

| C | Mn | Si | Ni | P | S |
|---|---|---|---|---|---|
| 0.06–0.07 | 1.1–1.28 | 0.5–0.65 | 1.0 | 0.011 | 0.011 |
| 0.06–0.07 | 1.1–1.35 | 0.5–0.70 | 1.0 | 0.011 | 0.010. |

8. The wire of claim 7, having the tensile strength which does not exceed 90,000 psi.

9. The wire of claim 1, wherein the core composition further comprises a percentage of Ni selected from the range from about 0% wt to about 4% wt.

10. An alternating current gas-metal arc welding apparatus comprising:
   a gas-metal arc welding gun having means for feeding an electrode into the gas-metal arc welding gun;
   the electrode comprising a sheath encapsulating a core having a core composition, the core composition comprising a combination of graphite and a compound of potassium, the combination of graphite and the compound of potassium in the core composition not exceeding approximately 5% by weight; and
   a power source for supplying alternating electrical current to the electrode.

11. The alternating current gas-metal arc welding apparatus of claim 10, further comprising a gas source supplying a shielding gas to the welding apparatus.

12. The alternating current gas-metal arc welding apparatus of claim 10, wherein the welding process is gas metal arc welding.

13. The alternating current gas-metal arc welding apparatus of claim 10, wherein the means for feeding the electrode into the welding gun comprise a wire drive and a wire reel.

14. The alternating current gas-metal arc welding apparatus of claim 10, wherein the compound of potassium is $K_2MnTiO_4$.

15. The alternating current gas-metal arc welding apparatus of claim 14, wherein the combination is selected from the range from about 0.3% to about 5.0%.

16. The alternating current gas-metal arc welding apparatus of claim 11, wherein the shielding gas comprises a mixture of Ar and $CO_2$.

17. The alternating current gas-metal arc welding apparatus of claim 10, wherein the alternating current does not exceed 1000 A at and the amplitude of an electron negative cycle reaches about 850–900 A.

18. The alternating current gas-metal arc welding apparatus of claim 10, wherein the diameter of the wire does not exceed about 5/32".

19. A alternating current gas-metal arc welding process comprising:
   providing an alternating current gas-metal arc welding apparatus having means for feeding an electrode into the gas-metal arc welding apparatus and means for supplying a shielding gas into the gas-metal arc welding apparatus;
   coupling the alternating current gas-metal arc welding apparatus to an alternating current power source and forming an arc;
   feeding the electrode into the alternating current gas-metal arc welding apparatus, the electrode comprising a sheath and a core having a core composition, the core composition comprising a combination of graphite and a compound of potassium, the combination of graphite and the compound of potassium in the core composition not exceeding approximately 5% by weight; and
   supplying the shielding gas into the alternating current gas-metal arc welding apparatus to shield the electrode and the arc.

20. The welding process of claim 19, wherein supplying the shielding gas into the alternating current gas-metal arc welding apparatus comprises providing an external gas source.

21. The welding process of claim 19, wherein feeding the electrode into the alternating current gas-metal arc welding apparatus comprises providing means for feeding the electrode that is external to the welding apparatus.

22. The welding process of claim 19, wherein supplying the shielding gas comprises providing a mixture of Ar and $CO_2$.

23. The welding process of claim 19, wherein the welding process is a gas metal arc welding process.

24. The welding process of claim 19, wherein the compound of potassium is $K_2MnTiO_4$.

25. The welding process of claim 24, wherein the combination is selected from the range from about 0.3% to about 5.0% by weight.

26. The welding process of claim 19, wherein the alternation current does not exceed 1000 A and wherein the amplitude of an electrode negative part of the cycle reaches about 850–900 A.

27. The welding process of claim 19, wherein the electrode comprises a percentage of Ni selected from the range of about 0% wt to about 4% wt.

28. The welding process of claim 19, wherein the electrode comprises up to 1% wt of Ni and exhibits a tensile strength of up to 90,000 psi.

29. The welding process of claim 19, wherein the diameter of the electrode does not exceed 3/32".

30. The welding process of claim 19, wherein the diameter of the wire does not exceed 5/32".

* * * * *